United States Patent [19]

Kissel

[11] 4,354,827
[45] Oct. 19, 1982

[54] PROCESS AND DEVICE FOR IMPROVING HEAT EXCHANGE IN FURNACES HEATED BY RADIANT HEATERS

[75] Inventor: Roland R. Kissel, Le Vesinet, France

[73] Assignee: Midland-Ross Corporation, Cleveland, Ohio

[21] Appl. No.: 255,244

[22] Filed: Apr. 17, 1981

[51] Int. Cl.³ .......................... F26D 7/04; F27B 3/22
[52] U.S. Cl. ...................................... 432/21; 219/400; 432/176; 432/199; 432/205; 432/209
[58] Field of Search ............... 432/21, 176, 198, 199, 432/202, 203, 205, 209; 13/31; 219/400; 373/110

[56] References Cited

U.S. PATENT DOCUMENTS

| | | | |
|---|---|---|---|
| 2,039,429 | 5/1936 | Lydon | 432/176 |
| 2,075,929 | 4/1937 | Davis | 432/21 |
| 3,198,503 | 8/1965 | Eichelberg et al. | 432/199 |
| 3,726,515 | 4/1973 | Knaak | 432/176 |
| 4,191,525 | 3/1980 | Sallman | 432/21 |
| 4,255,132 | 3/1981 | Carthew | 432/21 |

FOREIGN PATENT DOCUMENTS 580737  8/1959  United Kingdom ............... 219/400

Primary Examiner—John J. Camby
Attorney, Agent, or Firm—Harlan E. Hummer

[57] ABSTRACT

A furnace is described as having a heat treatment chamber which is provided with banks of radiant heaters to heat a load that is placed within the chamber for heat treatment. The radiant heating of the load is improved by the addition of convection heating which is carried out by a plurality of nozzles that are designed to direct jets or streams of heated gas against the load positioned in the chamber.

12 Claims, 1 Drawing Figure

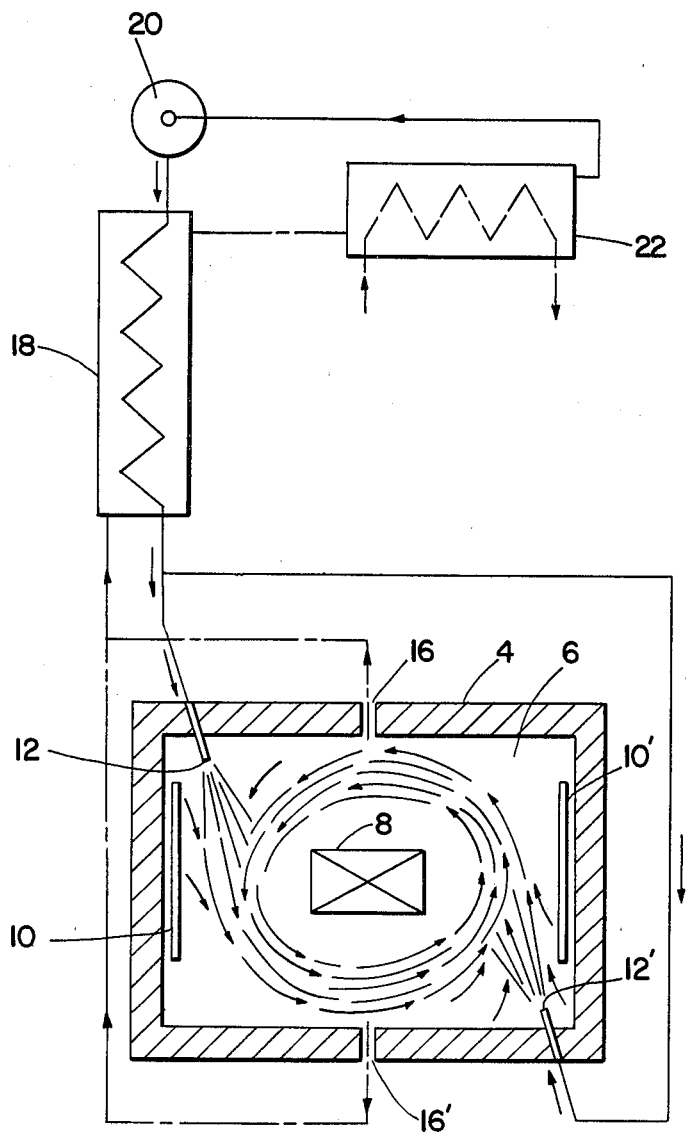

PROCESS AND DEVICE FOR IMPROVING HEAT EXCHANGE IN FURNACES HEATED BY RADIANT HEATERS

BACKGROUND OF THE INVENTION

The invention is directed to improving the heat exchange occurring in the heat treatment chamber of a furnace which is provided with radiant heaters or elements such as electrical resistances, radiant tubes, radiant burners, or the like. It has been found that certain types of multi-part loads such as, for example, racks of metal parts or ceramic pieces, are not properly heated in such furnaces.

The heat treatment of such loads has been improved by the use of fans which are provided to recirculate hot gas, exhausted from the chamber of the furnace, back to the chamber for impingement against the load. However, fans become inoperable above certain temperatures, thereby drastically limiting the temperature of the gas that can be recirculated to the chamber. The present invention is designed to improve the heat exchanges in radiant heater-type furnaces without resorting to the use of fans or other like devices which impose severe limitations upon the process.

Briefly stated, the invention concerns a process and device for improving the heat exchange in the heat treatment chamber of a radiant heater-type furnace, and is characterized by at least one nozzle which is designed to direct jets or streams of gas, under pressure, into the heat treatment chamber of the furnace in contact with a load positioned within the chamber. In the preferred embodiment, a plurality of nozzles are positioned such that the streams of gas, directed into the chamber, compliment and reinforce each other to produce an unusual swirling of gas within the furnace in the area of the load. The furnace is maintained, in balance, by exhausting from the chamber a volume of gas equal to that being blow into the chamber through the nozzles.

In another aspect of the invention, the exhaust gas is used to heat the incoming gas being circulated into the chamber through the nozzles.

DESCRIPTION OF THE DRAWING

The following description of the invention will be better understood by having reference to the accompanying drawing which is schematic, in nature, and designed to show the cross-section of a furnace which is made in accordance with the invention.

DETAILED DESCRIPTION OF THE DRAWING

With reference to the drawing, there is shown a radiant heater-type furnace 4 which has a heat treatment chamber 6 in which a load 8 is positioned for heat treatment by any suitable radiant heaters 10,10'. The heat treatment of the load 8 is improved by the addition of convection heating which is provided by a plurality of nozzles 12,12' which are diagonally opposed to direct complimentary and reinforcing high momentum jets or streams of gas, under pressure, into the chamber 6 in a pattern of swirling gas around and in contact with the load 8. Any appropriate, preferably heated gas, e.g. air, atmosphere gas, reducer gas of the HNX type, inert gas such as nitrogen, or steam, is circulated, under pressure, through the nozzles 12,12' for impingement against the load 8. As shown in the drawing, the nozzles 12,12' create within the chamber, an important flow pattern of gas that thoroughly saturates and sweeps the area in which the load 8 is located to provide good heat penetration of the load.

As previously indicated, a part of the gaseous atmosphere within the chamber 6, equal to the volume of gas being continuously blown into the chamber 6 through the nozzles 12,12', is constantly withdrawn or exhausted from the chamber 6 through a pair of opposing exhaust outlet ports 16,16' which are located to allow the removal of gas from within the chamber 6 without adversely disrupting the flow pattern of gas within the chamber 6. Exhaust gas, exiting the chamber 6 through the exhaust outlet ports 16,16', is circulated, under pressure, through a recuperator 18 into heat exchanging relation with incoming gas, e.g. air from the ambient atmosphere, that is being circulated, under pressure, to the nozzles 12,12' by any suitable compressor 20. The now cooler exhaust gas from the recuperator 18, can be more easily handled and discharged into the ambient atmosphere by any suitable blower, etc., or, in the case of a closed circuit system, circulated through a second recuperator 22 where it is temperature conditioned, e.g. preheated or still further cooled, for recirculation to the compressor 20, and subsequent passage through the first recuperator 18 and nozzles 12,12'. In any case, hot exhaust gas, direct from the chamber, is not brought into contact with fans which are unable to cope with such higher temperatures, e.g. exhaust gas at 1100° C.

The nozzles 12,12' may be installed in various other positions depending, for example, on the size or shape of the load and the particular location of the radiant heaters in the heat treatment chamber 6. In the heat treatment of a relatively narrow, but high load, for example, the nozzles 12,12' can be placed in the bottom of the chamber, below the load, and used to direct streams of heated gas upwardly through the load toward an exhaust outlet port that is located in the top of the chamber of the furnace. Thus, the high momentum gas streams would penetrate and impinge against a multi-part load positioned between the nozzles and the exhaust outlet port.

Thus, there has been described a highly improved process and device which utilizes both radiant and convection heating in the heat treatment of a load. There are no movable parts which can be adversely affected by the high temperature gas used in the process, thereby permitting the use of gases that are heated to higher temperatures than temperatures presently employed in systems which rely on fans for circulating hot gas to and from the heat treatment chamber of the furnace. Further, the nozzles can be positioned to produce a particular desired flow pattern of gas within the heat treatment chamber to prevent the gas from contacting and eroding adjacent furnace walls which, for example, are coated with fibrous refractory material. Moreover, nozzles can be quickly adapted to any radiant heater-type furnace and, in some instances, used in the cooling of a load, or in the alternate heating and cooling of a load.

What is claimed is:

1. A process of heating a load positioned within the heat treatment chamber of a furnace, comprising the steps of (I) radiantly heating the load by means of heat that radiates directly from at least one radiant heater in the chamber, (II) additionally convectionally heating the load by contacting the load with at least one continuous stream of heated gas that is blown, under pressure, into the chamber, (III) continuously exhausting hot gas from the chamber in accordance with the volume of incoming gas being blown into the chamber, and (IIII) circulating the hot exhaust gas, under a pressure lower than the pressure under which incoming gas is blown into the chamber, through a heat exchanger, outside the chamber, into heat exchanging relation with incoming gas being blown into the chamber, to heat the incoming gas, prior to blowing such gas into the chamber, and to cool the hot exhaust gas exiting the chamber.

2. The process of claim 1, characterized in that the incoming gas blown into the chamber, includes a gas of the group of a reducer gas of the HNX type, an inert gas, or a vapor.

3. The process of claim 2, further characterized in that a plurality of streams of gas are blown into the chamber in such a way that they compliment and reinforce each other to create a swirling of gas around the longitudinal axis of the chamber.

4. The process of claim 3, further characterized in that the jets or streams of gas are diagonally opposite each other and are directed in generally the same rotary direction.

5. The process of claims 1, 3 or 4, further characterized in that at least a portion of the exhaust gas is reheated and reused as incoming gas blown into the chamber, after being brought into heat exchanging relation with gas being blown into the chamber.

6. The process of claim 5, further characterized in that the gas blown into the chamber is different from the gaseous atmosphere in the chamber.

7. A furnace comprising: a heat treatment chamber; at least one radiant heater disposed in the chamber to radiate heat for heating a load positioned in the chamber; at least one gas nozzle coacting with the radiant heater for directing a continuous stream of gas, under pressure and heated outside the chamber, into the chamber to help heat the load positioned therein; a heat exchanger disposed outside the chamber; and means for exhausting hot gas from the chamber, at a pressure lower than the pressure under which heated gas is directed from the nozzle and passing such hot exhaust gas through the heat exchanger into heat exchanging relation with incoming gas being circulated through the heat exchanger to the nozzle, to heat the incoming gas and cool the exhaust gas.

8. The furnace of claim 7, characterized in that a plurality of nozzles are provided to direct complimentary, reinforcing streams of gas into the chamber to create therein a swirling of gas around the load to more thoroughly penetrate the load.

9. The furnace of claim 8, further characterized in that the nozzles are diagonally opposite each other, and the gas exhausting means are heated therebetween.

10. The furnace of claim 9, which includes a second heat exchanger through which cooled exhaust gas from the first heat exchanger is circulated for temperature conditioning, and means for recirculating, under a higher pressure, exhaust gas from the second heat exchanger successively through the first heat exchanger and nozzles.

11. The process of claim 1, wherein the exhaust gas leaving the chamber is at a temperature of at least 1100° C.

12. The furnace of claims 7 or 10, wherein the exhaust gas leaving the chamber is at a temperature of at least 1100° C.

* * * * *